United States Patent Office 3,655,635
Patented Apr. 11, 1972

3,655,635
TALL OIL ROSIN OF LOW SULFUR CONTENT
Thomas F. Sanderson, Wilmington, Del., assignor to Hercules Incorporated, Wilmington, Del.
No Drawing. Filed Jan. 28, 1969, Ser. No. 794,762
Int. Cl. C09f 1/02
U.S. Cl. 260—97.7   6 Claims

ABSTRACT OF THE DISCLOSURE

Disclosed is a process for removing sulfur compound impurities from tall oil rosin by dissolving tall oil rosin in a solvent followed by crystallization of the rosin component of the resulting solution.

---

This invention relates to tall oil rosin containing relatively small amounts of sulfur compound impurities and to the method of obtaining same.

Tall oil, a by-product recovered from pine wood "black liquor" of the sulfate paper process, is comprised of rosin acids, fatty acids, certain amounts of unsaponifiable material, and trace amounts of sulfur-containing compounds. A representative tall oil rosin is one comprised of, by weight, about 43% rosin acids (also referred to in the art as "resin acids"), about 41% fatty acids, about 16% unsaponifiable material and trace amounts of sulfur-containing compounds. Fractional distillation of tall oil yields a fraction rich in fatty acids, and a fraction rich in rosin acids. The fraction rich in rosin acids is often referred to in the art as "tall oil rosin," and will contain small amounts of fatty acids and trace amounts of sulfur-containing compounds. Further refinement of the tall oil rosin by distillation will lower the fatty acid content; however, the content of sulfur-containing compounds will remain substantially the same. The amount of sulfur present in the sulfur-containing compounds will usually be, by weight, at least about 300 parts per million (p.p.m.) parts of tall oil rosin and higher. The presence of such amounts of sulfur renders the attempted hydrogenation of tall oil rosin uneconomical in that the sulfur poisons hydrogenation catalysts, such as the noble metals, and renders them ineffective for their intended purpose.

Broadly, in accordance with this invention, there is provided a method of obtaining tall oil rosin having a content of sulfur of about 100 p.p.m. and less. It is understood that the sulfur is chemically combined and not in elemental form.

The tall oil rosin employed in carrying out this invention will be comprised of fatty acids and sulfur-containing compounds, the amount of sulfur present therein being from about 300 to about 600 parts per million (p.p.m.) parts of tall oil rosin. The fatty acids content will be less than about 10% by weight.

In carrying out this invention, a solution is prepared by dissolving, by weight, from about 25 parts to about 67 parts of the tall oil rosin in about 75 parts to about 33 parts of a polar solvent. If required, the solvent can be heated to accomplish substantially complete dissolution of the tall oil rosin. The solution is subsequently cooled at least to a temperature at which the rosin acids will crystallize out. Crystallization is permitted to continue until the desired amount of rosin acids has precipitated. The crystals can be recovered in any convenient manner as by decantation, centrifugation, filtration, or the like. The recovered crystals can be washed to remove adhering impurities, if desired. Polar solvents, such as those specifically disclosed herein, are recommended for the washing step.

The polar solvent employed will be liquid under room temperature conditions. Polar solvents that are liquid at temperatures as low as about —40° C. can be satisfactorily employed. Suitable polar solvents for use in carrying out this invention include acetone, methyl ethyl ketone, ethyl acetate, ethyl alcohol, methyl isobutyl ketone, isopropyl alcohol, diethylene glycol diethyl ether (diethyl Carbitol), diethylene glycol dimethyl ether (dimethyl Carbitol), and 2-methoxyethanol (methyl Cellosolve). Mixtures of two or more polar solvents can be employed if desired.

The following examples are illustrative of this invention. All parts and percentages are by weight unless otherwise specified.

EXAMPLE 1

Tall oil rosin, 100 parts, having a fatty acid content of about 4% and containing sulfur-containing compounds, the amount of sulfur present therein being about 550 parts per million (p.p.m.) parts of tall oil rosin is dissolved in an excess amount of acetone which has been heated to its boiling point (about 56.5° C.) and the acetone distilled off until there is provided a solution having a solids content of about 50%. The solution is cooled to a temperature of about 24° C. with constant stirring and crystals are formed. The crystals are recovered by filtration. The recovered crystals are washed with about 32 parts of cold acetone (about 0° C.) and then again washed with about 32 parts of cold acetone (about 0° C.). The washed crystals are placed in an oven maintained at a temperature of about 75° C. and dried. About 41.5 parts of tall oil rosin crystals are obtained which still contain trace amounts of sulfur-containing compounds; however, the amount thereof has been reduced substantially. The amount of sulfur has been reduced from 550 p.p.m. to 25 p.p.m.

EXAMPLE 2

Example 1 is repeated with the exception that the solution is cooled to 0° C. instead of 24° C. About 54.5 parts of tall oil rosin crystals are obtained which contain about 80 p.p.m. sulfur.

EXAMPLE 3

Example 1 is repeated with the exception that the solution is cooled to a temperature of about —17° C. instead of 24° C. About 62.2 parts of crystals are obtained which contain about 60 p.p.m. sulfur.

EXAMPLE 4

Example 1 is repeated with the exception that ethyl acetate is employed in place of the acetone of Example 1 and the resulting solution is cooled to a temperature of about —17° C. instead of 24° C. About 63.1 parts of crystals are obtained which contain about 100 p.p.m. sulfur.

EXAMPLE 5

Example 1 is repeated with the exception that methyl ethyl ketone is employed in place of acetone. About 28.7 parts of crystals are obtained which contain about 50 p.p.m. sulfur.

The examples set forth in Table I below are in further illustration of this invention. Parts and percentages are by weight. In the Table I examples, the tall oil rosin employed has an acid number of 177.5 and is comprised of, by weight, about 91.4% rosin acids; about 4.2% by weight fatty acids, and trace amounts of sulfur-containing compounds, the amount of sulfur present therein being about 520 p.p.m.

TABLE I

| Example Number | Solvent | Parts, solvent | Rosin (parts) | Percent solids in solution | Crystallization temperature, °C. | Crystals (parts) | Sulfur (p.p.m.) | Remarks |
|---|---|---|---|---|---|---|---|---|
| 6 | Mehtyl ethyl ketone | 100 | 100 | 50 | 25 | 28.7 | 60 | Crystals washed with about 20 parts of cold solvent (0° C.). |
| 7 | Ethyl alcohol | 100 | 100 | 50 | 25 | 33.9 | 64 | Do. |
| 8 | Ethyl acetate | 100 | 100 | 50 | 25 | 29.5 | 72 | Do. |
| 9 | Acetone | 100 | 100 | 50 | 25 | 33.0 | 40 | Do. |
| 10 | ...do | 200 | 200 | 50 | 0–3 | 100.0 | 52 | Washed twice with 32 parts solvent. |
| 11 | Methyl ethyl ketone | 200 | 200 | 50 | 0–3 | 79.9 | 72 | Do. |
| 12 | Ethyl alcohol | 200 | 200 | 50 | 0–3 | 94.5 | 76 | Do. |
| 13 | Acetone | 100 | 200 | 66.6 | 0–3 | 118.0 | 28 | Do. |
| 14 | Methyl ethyl ketone | 100 | 200 | 66.6 | 0–3 | 103.0 | 24 | Do. |
| 15 | Ethyl alcohol | 100 | 200 | 66.6 | 0–3 | 113.3 | 48 | Do. |
| 16 | Ethyl acetate | 100 | 200 | 66.6 | 0–3 | 115.6 | 24 | Do. |
| 17 | Acetone | 100 | 200 | 66.6 | 25 | 100.8 | 56 | Washed with about 120 parts acetonitrile. |
| 18 | Ethyl alcohol | 100 | 200 | 66.6 | 25 | 101.3 | 52 | Do. |
| 19 | Ethyl acetate | 300 | 600 | 66.6 | 0–3 | 343.0 | 80 | Washed three times with about 18 parts of ethyl acetate. |
| 20 | Acetone | 300 | 600 | 66.6 | 0–3 | 386.0 | 100 | Washed three times with about 65 parts cold (0° C.) solvent. |

The above examples illustrate a single crystallization step. The sulfur content of the recovered crystals can be further reduced if desired by repeating the crystallization procedure using the same or different solvent. The following example is illustrative of a recrystallization.

EXAMPLE 21

About 50 parts of the crystals of Example 1 are dissolved in 50 parts of acetone to provide a solution having a 50% solids content. The solution is cooled to about 25° C. and crystals are formed. The crystals, about 25 parts, are recovered by filtration and washed twice with 10 parts of acetone (at 0° C.). The washed crystals contain from about 5 to 10 p.p.m. combined sulfur.

The tall oil rosin of this invention can be used in the preparation of rosin size for paper manufacture. Also, the tall oil rosin of this invention can be hydrogenated economically. The hydrogenated product can be used in the manufacture of adhesives.

It is to be understood that the above description and examples are illustrative of this invention and not in limitation thereof.

What I claim and desire to protect by Letters Patent is:
1. A method for producing tall oil rosin containing less than about 10% by weight of tall oil fatty acids and having a content of sulfur not in excess of about 100 parts per million parts of tall oil rosin which consists essentially of (a) dissolving, by weight, from about 25 parts to about 67 parts of tall oil rosin containing less than about 10% by weight of tall oil fatty acids and sulfur-containing compounds, the amount of sulfur present therein being from about 300 to 600 parts per million parts of tall oil rosin in about 75 parts by weight to about 33 parts by weight of an organic polar solvent to provide a solution, (b) cooling the solution at least to a temperature at which crystals of rosin acid form, and (c) recovering the crystals of rosin acid.

2. The method of claim 1 wherein the polar solvent employed is selected from the group consisting of acetone, methyl ethyl ketone, ethyl acetate, ethyl alcohol, methyl isobutyl ketone, isopropyl alcohol, diethylene glycol diethyl ether, diethylene glycol dimethyl ether, 2-methoxyethanol, and mixtures of two or more.

3. The method of claim 1 wherein the recovered crystals are washed in an organic polar solvent and subsequently dried.

4. The method of claim 2 wherein the recovered crystals are washed in an organic polar solvent and subsequently dried.

5. The method of claim 1 wherein the steps (a), (b), and (c) are repeated at least once.

6. The method of claim 2 wherein the steps (a), (b), and (c) are repeated at least once.

References Cited

UNITED STATES PATENTS

| 2,530,810 | 11/1950 | Chistendon et al. | 260—97.7 |
| 2,547,208 | 4/1951 | Hasselstrom | 260—97.7 |
| 2,565,484 | 8/1951 | Dunlap et al. | 260—97.7 |
| 3,489,740 | 1/1970 | Cholet et al. | 260—97.7 |

OTHER REFERENCES

Mantell et al. "Industrial and Chemical Engineering" 1937, pp. 262 to 269.

Harris G. C. "Encyclopedia of Chemical Technology" 1953 p. 781.

DONALD E. CZAJA, Primary Examiner

W. E. PARKER, Assistant Examiner

U.S. Cl. X.R.

260—33.6, 97.6